(12) United States Patent
Gross et al.

(10) Patent No.: US 6,613,158 B2
(45) Date of Patent: Sep. 2, 2003

(54) METHYL ESTER-BASED CHEWING GUM REMOVER

(75) Inventors: Stephen F. Gross, Souderton, PA (US); David C. Sutton, Racine, WI (US)

(73) Assignees: Cognis Corporation, Gulph Mills, PA (US); Johnson Diversey, Inc., Sturtevant, WI (US)

(*) Notice: Subject to any disclaimer, the term of this patent is extended or adjusted under 35 U.S.C. 154(b) by 0 days.

(21) Appl. No.: 10/162,352

(22) Filed: Jun. 4, 2002

(65) Prior Publication Data

US 2003/0008789 A1 Jan. 9, 2003

Related U.S. Application Data

(60) Provisional application No. 60/297,819, filed on Jun. 13, 2001.

(51) Int. Cl.$^7$ .............................. C11D 1/04; C11D 3/20; C11D 3/50; B08B 3/00
(52) U.S. Cl. ....................... 134/40; 134/25.2; 134/25.3; 134/39; 134/42; 510/101; 510/200; 510/238; 510/239; 510/240; 510/241; 510/243; 510/244; 510/245; 510/434; 510/476; 510/488; 510/503
(58) Field of Search ................................. 510/101, 200, 510/238, 239, 240, 241, 243, 244, 245, 434, 476, 488, 503; 134/25.2, 25.3, 39, 40, 42

(56) References Cited

U.S. PATENT DOCUMENTS

| 4,306,989 A | 12/1981 | Motsenbocker | 252/162 |
| 4,533,487 A | 8/1985 | Jones | 252/170 |
| 5,080,821 A | 1/1992 | Lutringer | 252/170 |
| 5,720,825 A | * 2/1998 | Kinnaird | 134/40 |

FOREIGN PATENT DOCUMENTS

| GB | 2 336 596 | 4/1999 | C11D/3/20 |
| WO | WO 96/00622 | * 1/1996 | B08B/3/00 |

* cited by examiner

Primary Examiner—Mark Kopec
Assistant Examiner—Brian P. Mruk
(74) Attorney, Agent, or Firm—John E. Drach; Steven J. Trzaska

(57) ABSTRACT

A chewing gum remover composition containing: (a) a $C_{1-4}$ alkyl ester of a $C_{6-22}$ saturated or unsaturated carboxylic acid; (b) a terpene; and (c) optionally, an oil-soluble surfactant, and wherein (a) and (b) are present in the composition in a ratio by weight of from about 10:1 to about 1:10.

37 Claims, No Drawings

METHYL ESTER-BASED CHEWING GUM REMOVER

CROSS-REFERENCE TO RELATED APPLICATIONS

This application claims the benefit of copending provisional application Serial No. 60/297,819 filed on Jun. 13, 2001.

STATEMENT REGARDING FEDERALLY SPONSORED RESEARCH OR DEVELOPMENT

Not Applicable.

BACKGROUND OF THE INVENTION

The present invention generally relates to a cleaning composition. More particularly, the invention relates to a novel cleaning formulation and process for removing chewing gum from hard surfaces. The cleaning composition is readily biodegradable, low in toxicity and volatility, neutral in pH, and is primarily derived from natural resources.

BRIEF SUMMARY OF THE INVENTION

The present invention is directed to a cleaning composition for removing chewing gum from hard surfaces, the composition containing:

(a) a $C_{1-4}$ alkyl ester of a $C_{6-22}$ saturated or unsaturated carboxylic acid;

(b) a terpene; and (c) optionally, an oil-soluble surfactant to facilitate water rinseability, wherein (a) and (b) are present in the composition at a ratio by weight of from about 10:1 to about 1:10.

The present invention is also directed to a process for removing chewing gum from a hard surface involving contacting the chewing gum with the above-identified cleaning composition

BRIEF DESCRIPTION OF THE SEVERAL VIEWS OF THE DRAWING

Not applicable.

DETAILED DESCRIPTION OF THE INVENTION

Other than in the operating examples, or where otherwise indicated, all numbers expressing quantities of ingredients or reaction conditions used herein are to be understood as being modified in all instances by the term "about".

The present invention is directed to a cleaning composition which is highly effective at removing chewing gum from a hard surface. The cleaning composition is entirely naturally derived, biodegradable, and has a very low eco-tox profile. The cleaning composition is based on a combination of a $C_{1-4}$ alkyl ester of a $C_{6-22}$ saturated or unsaturated carboxylic acid, acting as a primary solvent, a terpene component and, optionally, an oil-soluble surfactant.

The primary solvent used employed by the present invention is a $C_{1-4}$ alkyl ester of a $C_{6-22}$ saturated or unsaturated carboxylic acid. The use of an alkyl ester as a solvent in cleaning compositions is significantly more desirable than conventional solvents, such as hydrocarbon derivatives, for environmental reasons.

A particularly preferred $C_{1-4}$ alkyl ester of a $C_{6-22}$ saturated or unsaturated carboxylic acid for use in the present invention is a methyl ester corresponding to formula I:

  (I)

wherein $R_1$ is an alkyl radical having from about 6 to about 14 carbon atoms. It is derived by the esterification of a fatty acid with methanol. Preferred methyl esters are those derived from the esterification of unsaturated fatty acids having from about 8 to about 10 carbon atoms. Suitable fatty acids from which the fatty acid esters may be derived include, but are not limited to, coconut and other vegetable oils, tallow, etc.

The $C_{1-4}$ alkyl ester of a $C_{6-22}$ saturated or unsaturated carboxylic acid will typically be present in the chewing gum remover composition in preferred amounts ranging from about 10 to about 90% by weight; from about 35 to about 80% by weight; from about 65 to about 75% by weight, based on the weight of the composition.

Any saturated or unsaturated terpene may be used in formulating the composition of the present invention, as well as terpene derivatives commonly referred to as terpenoids. Particularly preferred terpenes for use in the present invention are the monocyclic terpenes such as, for example, dipentene.

The terpene component will typically be present in the chewing gum remover composition in preferred amounts ranging from about 10 to about 90% by weight; from about 15 to about 60% by weight; from about 20 to about 30% by weight, based on the weight of the composition.

Suitable oil-soluble surfactants which may be employed in the present invention include, but are not limited to, oil-soluble salts of alkyl benzene sulfonates, alkyl sulfates, alkyl polyethoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, and alkyl phenol polyethoxyether sulfates.

Other suitable oil-soluble surfactants include non-ionic fatty alcohol alkoxylates and nonyl or octyl phenol alkoxylates with HLB values ranging from about 6–12.

A particularly preferred oil-soluble surfactant for use in the present invention is sulfated castor oil, commonly known as Turkey Red Oil.

The oil-soluble surfactant will typically be present in the chewing gum remover composition in preferred amounts ranging from about 0.1 to about 10% by weight; from about 1 to about 7% by weight; from about 3 to about 5% by weight, based on the weight of the composition.

It has also been found to be particularly advantageous to employ an amine oxide, in combination with an oil-soluble anionic surfactant, in order to further enhance the end-user's ability to rinse away the undesirable chewing gum from a hard surface using a stream of water.

Suitable amine oxides which may be employed in the present invention include those which correspond to formula II:

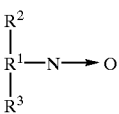  (II)

wherein $R^1$ is an alkyl or alkenyl radical having from about 7 to about 18 carbon atoms, and $R^2$ and $R^3$ are individually alkyl or hydroxyalkyl radicals having from about 1 to about 4 carbon atoms. Examples of amine oxides which may be used in the present invention include, but are not limited to lauryl amine oxide, cocamine oxide, cocamidopropyl amine oxide, lauryl amido propyl amine oxide. A particularly preferred amine oxide is oleyl dimethyl amine oxide, commercially available under the tradename STANDAMOX® 01.

It should also be noted that tertiary amine oxides, wherein the radical RCO represents a coconut acid or lauric acid radical, may also be used.

In the event that an amine oxide is employed, it will typically be present in the composition in preferred amounts ranging from about 0.1 to about 10% by weight; from about 0.3 to about 5% by weight; from about 0.5 to about 1% by weight, based on the weight of the composition.

According to another embodiment of the present invention, there is provided a process for removing chewing gum from a hard surface involving contacting the chewing gum with the above-disclosed composition. The present invention will be better understood by the examples which follow, all of which are intended for illustrative purposes only, and are not meant to unduly limit the scope of the invention in any way. Unless otherwise indicated, percentages are on a weight-by-weight basis.

EXAMPLES

A chewing gum remover composition was prepared in accordance with the present invention. Its formulation is found in Table 1, below.

TABLE 1

| Component | % wt |
| --- | --- |
| methyl ester | 70 |
| dipentene | 25 |
| sulfated castor oil | 4 |
| oleyl dimethyl amine oxide | 1 |

The above formulation can be applied onto chewing gum on sidewalks and after about 5 to 10 minutes of dwell time, the gum will be sufficiently loosened to enable it to be rinsed away with a stream of water from a pressure washer or garden hose.

What is claimed is:

1. A chewing gum remover composition comprising:
   (a) a $C_{1-4}$ alkyl ester of a $C_{6-22}$ saturated or unsaturated carboxylic acid;
   (b) a terpene; and
   (c) an oil-soluble surfactant selected from the group consisting of oil-soluble salts of alkyl benzene sulfonates, alkyl sulfates, alkyl polyethoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, and alkyl phenol polyethoxyether sulfates, and wherein (a) and (b) are present in the composition in a ratio by weight of from about 10:1 to about 1:10.

2. The composition of claim 1 wherein (a) is a methyl ester corresponding to formula I:

$$R_1COOCH_3 \quad (I)$$

wherein $R_1$ is an alkyl radical having from about 6 to about 14 carbon atoms.

3. The composition of claim 1 wherein (a) is present in the composition in an amount of from about 10 to about 90% by weight, based on the weight of the composition.

4. The composition of claim 1 wherein (a) is present in the composition in an amount of from about 35 to about 80% by weight, based on the weight of the composition.

5. The composition of claim 1 wherein (a) is present in the composition in an amount of from about 65 to about 75% by weight, based on the weight of the composition.

6. The composition of claim 1 wherein (b) is a dipentene.

7. The composition of claim 1 wherein (b) is present in the composition in an amount of from about 10 to about 90% by weight, based on the weight of the composition.

8. The composition of claim 1 wherein (b) is present in the composition in an amount of from about 15 to about 60% by weight, based on the weight of the composition.

9. The composition of claim 1 wherein (b) is present in the composition in an amount of from about 20 to about 30% by weight, based on the weight of the composition.

10. The composition of claim 1 wherein the oil-soluble surfactant is a sulfated castor oil.

11. The composition of claim 1 wherein the oil-soluble surfactant is present in the composition in an amount of from about 0.1 to 10% by weight, based on the weight of the composition.

12. The composition of claim 1 wherein the oil-soluble surfactant is present in the composition in an amount of from about 1 to 7% by weight, based on the weight of the composition.

13. The composition of claim 1 wherein the oil-soluble surfactant is present in the composition in an amount of from about 3 to 5% by weight, based on the weight of the composition.

14. The composition of claim 1 further comprising an amine oxide.

15. The composition of claim 14 wherein the amine oxide is oleyl dimethyl amine oxide.

16. The composition of claim 14 wherein the amine oxide is present in the composition in an amount of from about 0.1 to about 10% by weight, based on the weight of the composition.

17. The composition of claim 14 wherein the amine oxide is present in the composition in an amount of from about 0.3 to about 5% by weight, based on the weight of the composition.

18. The composition of claim 14 wherein the amine oxide is present in the composition in an amount of from about 0.5 to about 5% by weight, based on the weight of the composition.

19. A chewing gum remover composition comprising:
   (a) from about 65 to about 75% by weight of a $C_{6-14}$ methyl ester;
   (b) from about 20 to about 30% by weight of a dipentene;
   (c) from about 3 to about 5% by weight of sulfated castor oil; and
   (d) from about 0.5 to about 1% by weight of oleyl dimethyl amine oxide, all weights being based on the weight of the composition.

20. A process for removing chewing gum from a hard surface comprising contacting the chewing gum with a cleaning composition containing:
   (a) a $C_{1-4}$ alkyl ester of a $C_{6-22}$ saturated or unsaturated carboxylic acid;
   (b) a terpene; and
   (c) optionally, an oil-soluble surfactant, and wherein (a) and (b) are present in the composition in a ratio by weight of from about 10:1 to about 1:10.

21. The process of claim 20 wherein (a) is a methyl ester corresponding to formula I:

$$R_1COOCH_3 \quad (I)$$

wherein $R_1$ is an alkyl radical having from about 6 to about 14 carbon atoms.

22. The process of claim 20 wherein (a) is present in the composition in an amount of from about 10 to about 90% by weight, based on the weight of the composition.

23. The process of claim 20 wherein (a) is present in the composition in an amount of from about 35 to about 80% by weight, based on the weight of the composition.

24. The process of claim 20 wherein (a) is present in the composition in an amount of from about 65 to about 75% by weight, based on the weight of the composition.

25. The process of claim 20 wherein (b) is a dipentene.

26. The process of claim 20 wherein (b) is present in the composition in an amount of from about 10 to about 90% by weight, based on the weight of the composition.

27. The process of claim 20 wherein (b) is present in the composition in an amount of from about 15 to about 60% by weight, based on the weight of the composition.

28. The process of claim 20 wherein (b) is present in the composition in an amount of from about 20 to about 30% by weight, based on the weight of the composition.

29. The process of claim 20 wherein the oil-soluble surfactant is a sulfated castor oil.

30. The process of claim 20 wherein the oil-soluble surfactant is present in the composition in an amount of from about 0.1 to 10% by weight, based on the weight of the composition.

31. The process of claim 20 wherein the oil-soluble surfactant is present in the composition in an amount of from about 1 to 7% by weight, based on the weight of the composition.

32. The process of claim 20 wherein the oil-soluble surfactant is present in the composition in an amount of from about 3 to 5% by weight, based on the weight of the composition.

33. The process of claim 20 wherein said composition further comprises an amine oxide.

34. The process of claim 33 wherein the amine oxide is oleyl dimethyl amine oxide.

35. The process of claim 33 wherein the amine oxide is present in the composition in an amount of from about 0.1 to about 10% by weight, based on the weight of the composition.

36. The process of claim 33 wherein the amine oxide is present in the composition in an amount of from about 0.3 to about 5% by weight, based on the weight of the composition.

37. The process of claim 33 wherein the amine oxide is present in the composition in an amount of from about 0.5 to about 1% by weight, based on the weight of the composition.

* * * * *